Sept. 19, 1950 M. J. STEVENS 2,522,845
KEY OPERATED SELECTIVE REGISTER FOR METER CONTROL
Filed June 11, 1945 2 Sheets-Sheet 1
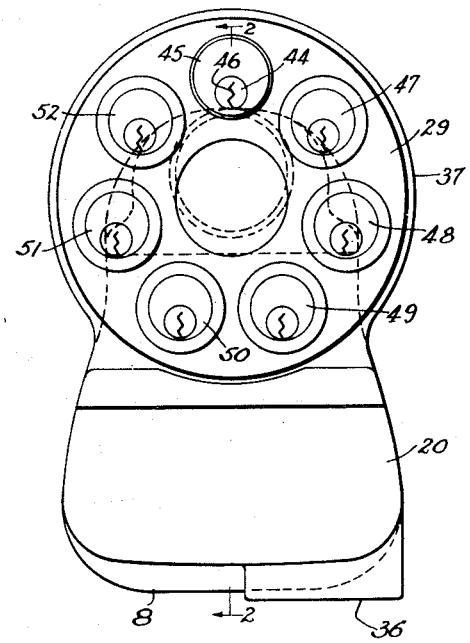
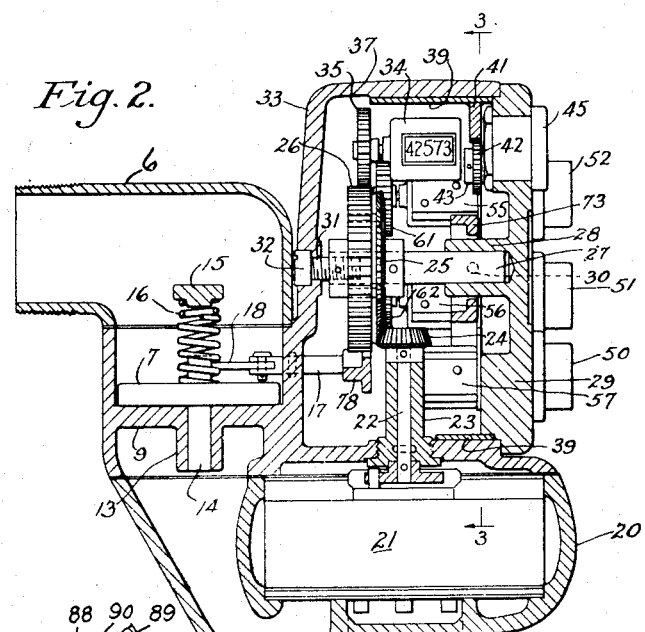
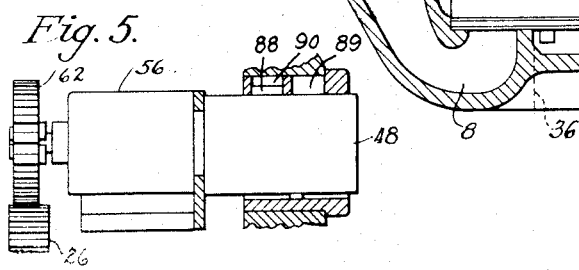
INVENTOR.
Milton J. Stevens
BY Carlos G. Stratton
ATTORNEY Sept. 19, 1950  M. J. STEVENS  2,522,845
KEY OPERATED SELECTIVE REGISTER FOR METER CONTROL
Filed June 11, 1945  2 Sheets-Sheet 2

INVENTOR.
Milton J. Stevens
BY Carlos G. Stratton
ATTORNEY

Patented Sept. 19, 1950

2,522,845

UNITED STATES PATENT OFFICE 2,522,845

KEY OPERATED SELECTIVE REGISTER FOR METER CONTROL

Milton J. Stevens, Glendale, Calif., assignor of one-third to I. W. Adams, Pasadena, and one-third to Milo R. Kent, Glendale, Calif.

Application June 11, 1945, Serial No. 598,771

3 Claims. (Cl. 235—94)

My invention relates to a meter assembly and more particularly to a grouping of meters in a convenient arrangement for individually measuring the amounts that are drawn out by or for respective persons, or for respective uses.

Another object is to register the quantity of liquid dispensed by respective persons from a single source, in order to provide a check against unauthorized withdrawal.

A further object is to provide a register for the amounts that respective persons withdraw from a single source, without such persons being able to see the register, but permitting an authorized person to see all of the registers of the respective persons.

Still another object is to permit each of a group of persons to withdraw material from a single source through a single channel, measure the quantity drawn from the source by the respective persons, and prevent any unauthorized person, e. g., a co-employee, from registering the material to the wrong person.

Generally speaking, it is an object of the invention to minimize shortages in filling stations in a new and effective manner.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a front elevational view of an embodiment of the foregoing objects.

Fig. 2 is a vertical section on the line 2—2 of Fig. 1.

Fig. 5 is a fragmentary view of a portion of the upper part of Fig. 4, in a different operative position.

Figure 3:
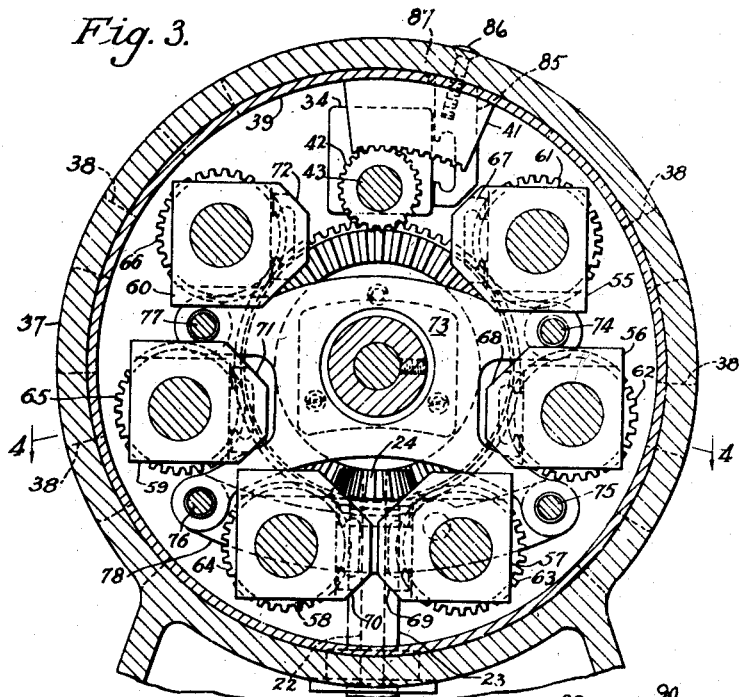
Fig. 3 is an enlarged section taken on the line 3—3 of Fig. 2.

Referring more in detail to the drawings, the reference numeral 6 indicates an inlet conduit for liquid, e. g., gasoline. A damper-type valve 7 controls the flow through the inlet to a sump 8. A partition 9 has a circular series of openings 10 with which the openings 12 of the valve 7 are moved in and out of register. A journal 13 supports a spindle 14 on the valve 7.

A cross bar 15 provides an abutment for a spring 16 that also abuts against the top of the valve 7, around an upper, projecting portion of the spindle 14. Means to rotate the valve 7 includes a reciprocating bar 17, and a thereto pivoted link 18. The link is also pivoted to the valve 7, as indicated at 19.

In a bottom housing 20 is enclosed a suitable liquid metering apparatus 21. There are several types of suitable metering apparatus on the market, so the construction of a suitable one is well known to those skilled in the art and, therefore, does not have to be described here nor shown in detail. Suffice to say, the metering apparatus 21 rotates a shaft 22 within a bearing 23. The liquid coming into the metering apparatus 21 from the sump 8 passes out from such apparatus through an outlet passage 36.

A bevel gear 24 is pinned on the end of the shaft 22 and continuously drives a ring gear 25 that is permanently bolted on a spur gear 26, as shown at 93. Collars 53 and 54 are held on the shaft 27 by set screws and permit the rotation of the gears 25 and 26 therebetween. The spur gear 26 is in turn loose on the arbor 27 which is held by a set screw 30 in a journal 28 in the front plate 29 of the device.

The normally rear end of the arbor 27 is supported by a screw 31 that engages a tapped opening in the rear end of the arbor. The screw 31 has a countersunk head 32 in the back plate 33 of the housing for the device. It will be noted that the screw head 32 is hidden behind the inlet conduit 6, so that the screw may not be unscrewed by unauthorized persons.

A counter 34 is at all times during the operation connected with the spur gear 26 through the intermediary of a smaller gear 35. The counter 34 thereby registers all liquid that flows through the device. The details of construction of the counter 34 and all other counters referred to herein may be of conventional construction well known to those skilled in the art. The counter 34 is supported by a bracket 85 that is fixed inside the housing by a bolt 86.

The circumferential portion 37 of the housing of the device contains a plurality of windows 38 that are normally closed by a rotatable bushing 39. The bushing 39 also has a plurality of windows 40 arranged whereby they are in register with the windows 38 when the bushing is rotated. A slot 87 in the bushing 39 permits the bushing to span the bracket 85.

Means to rotate the bushing 39 comprises a gear segment 41 fastened on the inner face of the bushing and a pinion 42 that is connected to drive the segment. The spindle 43 of the pinion 42 carries the bolt 44 of the master lock 45 at the top of the device. Thus rotation of the bolt 44 by a key (not shown) in the slot 46 will effect opening and closing of the openings 38, depending upon which direction the key is turned in the lock 45.

A plurality of key-controlled locks 47 to 52, inclusive, are arranged around the face 29 of the housing. The locks 47 to 52 carry counters 55 to 60, respectively, while the counters 55 to 60 in turn carry gears 61 to 66, respectively, that mesh with the spur gear 26 when such gears are selectively pushed into engagement therewith.

Front end plates of the counters 55 to 60 have lugs 67 to 72 that are engaged by a front spider 73 mounted to slide on stationary rods 74 to 77 that are supported on front and rear plates 29 and 33 of the housing. A rear spider 78 is connected with the front spider 73 by sleeves 79 slidable on the rods 74 to 77 for conjoint movement of the spiders. The rear spider 78 slides along the rods 75 and 76 only. The front spider is bowed upwardly to miss the bevel gear 24 when the spiders are pushed rearward, while the rear spider is bowed downwardly in order to miss the spur gear 26.

Figure 4:
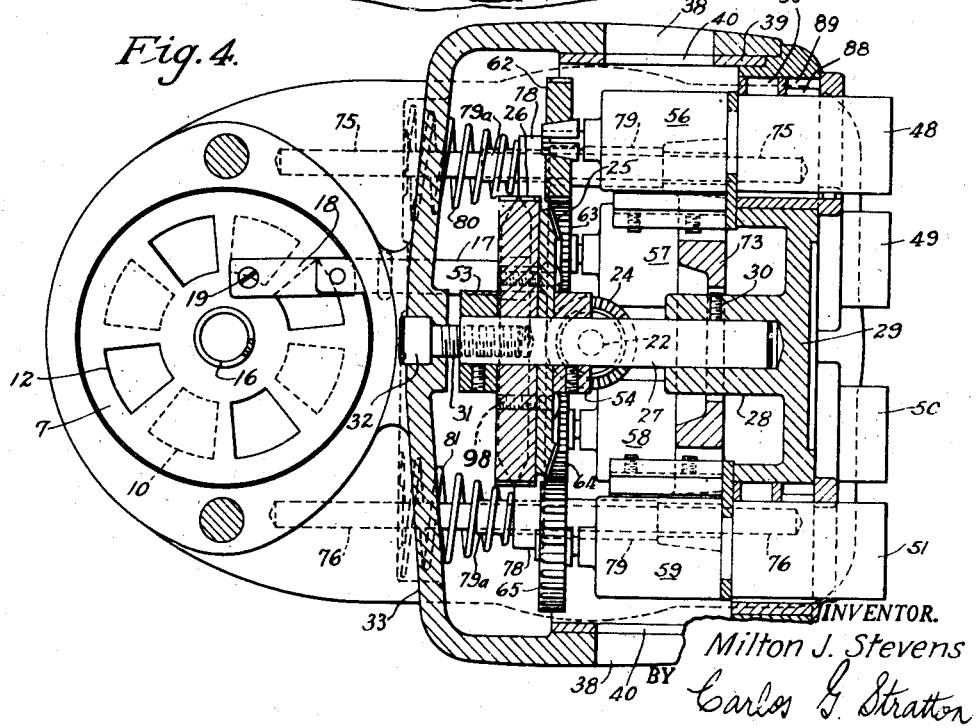
Fig. 4 is a transverse section taken on the bent line 4—4 of Fig. 3.

The sleeves 79, in reduced diameter, extend through the spider 78, as shown at 79a, and provide bearings for coiled springs 80 and 81 that resist rearward movement of the spiders by abutting the rear of the two connected spiders. The springs 80 and 81 also move all the gears 61 to 66 out of engagement with the spur gear 26, when the locks 47 to 52 are turned to permit the last-mentioned gears respectively to be disengaged. The reciprocating bar 17, hereinbefore referred to, connects with the rear spider 78 and is actuated thereby. Each of the locks 47 to 52 has a bolt, as shown at 88 in Fig. 4. In this figure the lock 48 is locked in a position in which the gear 62 is out of mesh with the spur gear 26. When the bolt 88 is retracted from its locking position shown in Fig. 4, by a suitable key (not shown), the lock is then pushed in until the gear 62 is in mesh with the gear 26, as shown in Fig. 5. The bolt 88 may then again be moved to a projecting position, as shown in the latter figure. Recesses 89 and 90 are provided for the bolt 88 when the gear 62 is respectively out of gear with the spur gear 26 and when these gears are in mesh with each other. Thus the gear 62 is locked in either of its two said positions.

In the operation and use of my present device, the master lock 45 is normally turned so that the bushing 39 closes the openings 38 in the housing. It is intended that only the owner or superintendent, or the like, shall have a key to operate the master lock 45. Keeping the bushing 39 closed will prevent others drawing liquid from the source (not shown) connected with the inlet conduit 6, from knowing exactly how much they have respectively or in the aggregate drawn from the source, in order to minimize the desire for tampering with the device or attempting in some way to justify shortages. The holder of the key to the master lock 45 may also, of course, check the aggregate amount withdrawn from the source through the present apparatus.

Each employee is intended to have a key that will only unlock his particular lock. Suppose a given employee has a key that will only unlock the lock 47. When he wishes to withdraw liquid from the source, he inserts his key in the lock 47 and pushes the lock inward, the bolt of the lock normally preventing the lock from being pushed inward, as is well understood by those skilled in the art. Inward movement of the lock 47, for instance, causes the counter 55 to push its gear 61 into engagement with the spur gear 26 (all the other gears 62 to 66 being out of engagement therewith). Then the key is turned in the lock 47, locking the gear 61 in mesh with the spur gear 26, which is clear to those skilled in the art without further illustration or description.

Pushing the counter 55 rearward also effects rearward movement of the connected spiders 73 and 78 by contact of the lower edge of the lug 67 with the spider 73. Rearward movement of the spider 78 causes rotation of the valve 7 by reason of the linkage 18, so that liquid can flow from the inlet conduit 6 to the metering apparatus 21 and discharge through the outlet passage 36. Thus it will be seen that the valve 7 will remain closed until one of the locks is pushed in, and the valve resumes its closed position when all the locks are in their outward positions. Operation of the metering apparatus 21 drives the bevel gear 24, which effects operation of the counter 55 through the intermediary of the gears 25, 26 and 61. Thus the liquid drawn from the source by the holder of the key to lock 47 is only registered on the counter 55, but the measure thereof is not visible to the holder of such key. Of course, the operation explained in connection with lock 47 is the same for locks 48 to 52.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a meter assembly, a valve, metering means arranged to measure the quantity of liquid passing through the valve, a plurality of counters movable respectively to a position in which each is connected to be operated by the metering means and to a position in which the operative connection with the metering means is broken, lugs on said counters, a slidable spider arranged to be moved conjunctively with and by the lugs on the counters, a lever connecting the spider and valve, spring means actuating the spider to move the counters to one of their said positions and to operate simultaneously said spider and the valve, and lock means arranged to lock the counters respectively in their valve opening positions against the action of the spring means, said lock means comprising a lock fixed to and movable with each counter.

2. In a meter assembly, a housing, a valve, metering means arranged to measure the quantity of liquid passing through the valve, a gear connected to be driven by the metering means, a plurality of driven gears movable between meshing and non-meshing positions with respect to the first-mentioned gear, counters carrying the driven gears respectively and provided with lugs, rods in said housing, a spider slidably supported on said rods, a lever connecting said spider and valve, springs to hold said spider in engagement with the lugs on said counters thereby to move the driven gears to one of their said positions and to operate the valve, and lock means arranged to lock the driven gears respectively in their other positions against the action of the spring means, said lock means comprising a lock fixed to and movable with each counter.

3. In a meter assembly, a valve, metering means arranged to measure the quantity of liquid passing through the valve, a master gear connected to be operated by the metering means, gear-actuated counters arranged to be selectively moved to positions in which the counter gears respectively engage the master gear, a spider, means connected with the spider to actuate the valve when any of the counters is so moved that its respective gear engages the master gear, yielding means for holding the spider in contact with said counters, and key-controlled individually releasable locks each respectively aligned and end-abutted with the counters, each lock, upon release, moving together with its related counter and counter gear to engage the latter gear with the master gear, whereby the master operates the counter so moved.

MILTON J. STEVENS.

REFERENCES CITED

The following references are of record in the file of this patent:

UNITED STATES PATENTS

| Number | Name | Date |
| --- | --- | --- |
| 1,439,904 | Lockwood | Dec. 26, 1922 |
| 1,475,368 | Chilson | Nov. 27, 1923 |
| 1,525,504 | Julian | Feb. 10, 1925 |
| 1,650,073 | Julian | Nov. 22, 1927 |
| 1,725,978 | Dement | Aug. 27, 1929 |
| 1,808,447 | Asper | June 2, 1931 |
| 1,880,299 | Tebault | Oct. 4, 1932 |
| 2,024,492 | Wallace | Dec. 17, 1935 |
| 2,174,656 | Hanrahan et al. | Oct. 3, 1939 |
| 2,322,712 | Hazard | June 22, 1943 |